United States Patent [19]

Adair

[11] 3,950,118

[45] Apr. 13, 1976

[54] CONTROL OF TEMPERATURE PROFILE ACROSS A HEAT EXCHANGER

[75] Inventor: James G. Adair, Bartlesville, Okla.

[73] Assignee: Phillips Petroleum Company, Bartlesville, Okla.

[22] Filed: May 17, 1974

[21] Appl. No.: 470,742

[52] U.S. Cl. .................................. 425/144; 264/40
[51] Int. Cl.² .......................................... B29F 3/08
[58] Field of Search ...................... 425/144; 264/40

[56] References Cited
UNITED STATES PATENTS

| | | |
|---|---|---|
| 2,722,716 | 11/1955 | Henning .............................. 425/144 |
| 3,354,501 | 11/1967 | Bachmann et al. ................... 425/144 |
| 3,502,133 | 3/1970 | Carson ............................. 164/154 X |
| 3,759,309 | 9/1973 | Nighman .......................... 164/154 X |

Primary Examiner—R. Spencer Annear

[57] ABSTRACT

The temperature profile established across a heat exchanger, such as employed on an extrusion die, for example, is controlled by introducing fluid into the heat exchanger at a predetermined temperature. The temperature of the fluid withdrawn from the heat exchanger is measured, and the rate of flow of fluid through the heat exchanger is controlled in response to the measured temperature to maintain the measured temperature at a predetermined value.

5 Claims, 3 Drawing Figures

CONTROL OF TEMPERATURE PROFILE ACROSS A HEAT EXCHANGER

It is common practice to produce articles from thermoplastic resins by extrusion processes wherein the resin is melted and forced through a die under pressure to form the article. This process is particularly useful in forming elongated articles such as pipes, bars, rods and the like. One extrusion method that has recently been developed is commonly referred to as "dynamic extrusion". In this process, particles of resin are introduced into an extruder wherein they are melted and forced through a long land die by the application of a reciprocating force. The die is cooled and is of sufficient length that the extruded article is substantially solidified before emerging from the die nozzle.

In extrusion processes, particularly those involving the use of long land dies, one of the factors which limits production is the rate at which heat can be removed from the extrudate as it moves through the die. In order to provide adequate cooling, it is common practice to circulate a cooling fluid through heat exchangers adjacent the die passage. If a hollow article such as a pipe is being extruded, heat exchangers are often positioned both externally and internally of the die passage. The resulting cooling causes the resin to solidify and to shrink slightly. Because of this shrinkage, the surfaces of the extrudate may not remain in firm contact with the die. The resulting air gap acts as an insulator which tends to reduce the rate at which heat is removed. One solution to this problem involves the use of a tapered die to compensate for shrinkage as the resin solidifies. A die of this type is described in U.S. Pat. No. 3,393,427.

While the use of a tapered die improves the heat transfer rate in an extrusion process of the type described, it is difficult to design a die which has the correct taper for all operating conditions. In accordance with one aspect of this invention, there is provided a method of controlling the temperature profile along a heat exchanger which serves to improve the operation of an extrusion die. A cooling fluid is introduced into one end of the heat exchanger at a predetermined temperature. The temperature of the fluid withdrawn from the second end of the heat exchanger is measured, and the rate of flow of fluid through the heat exchanger is controlled in response to the measured temperature. This results in maintaining a predetermined temperature drop across the heat exchanger, which can be adjusted to improve the heat transfer profile. Apparatus is provided in accordance with another aspect of this invention for carrying out the control method in an automatic manner.

In the accompanying drawing.

Figure 1:
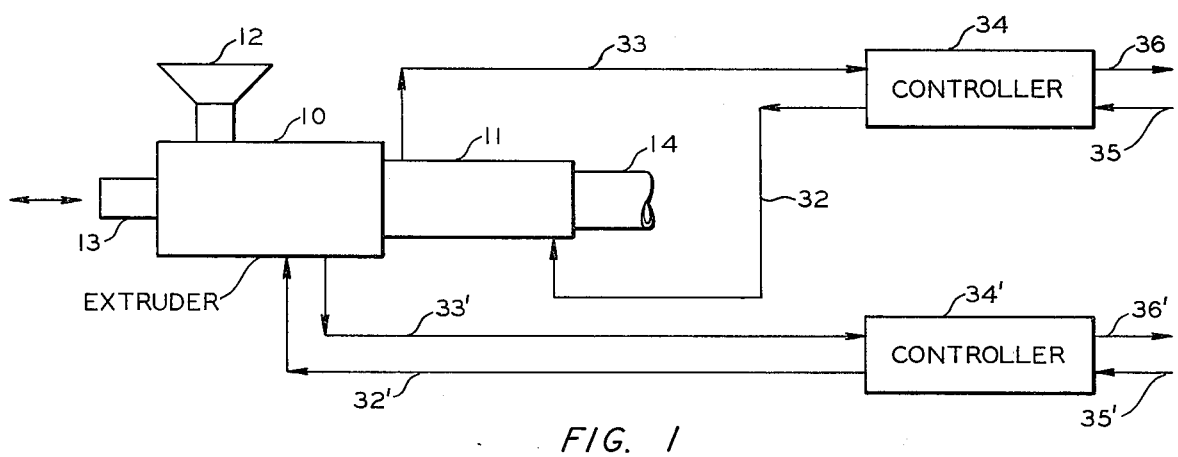
FIG. 1 is a schematic representation of an extruder having temperature control apparatus of this invention incorporated therein.

Referring now to the drawing in detail and to FIG. 1 in particular, there is shown an extruder having a body member 10 and a die 11. A thermoplastic resin is introduced into the extruder through a hopper 12. The extruder is provided with a reciprocating piston 13 which is driven by an external drive mechanism, not shown. A pipe or other extrudate 14 emerges from die 11. Such an extruder can be of the type described in U.S. Pat. No. 3,239,881, the disclosure of which is herein incorporated by reference.

Figure 2:
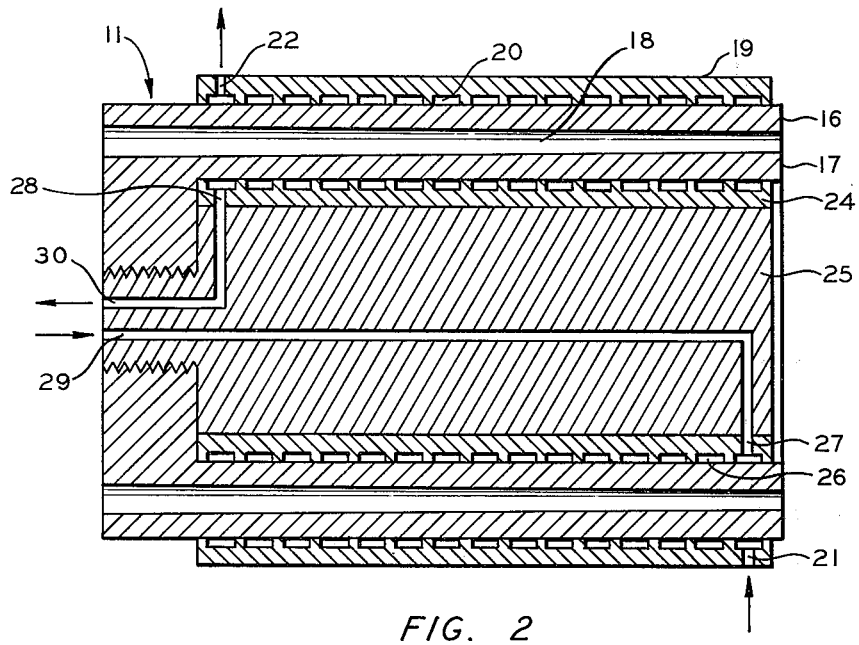
FIG. 2 is a cross-sectional view of an embodiment of an extrusion die employed in the apparatus of FIG. 1.

The outlet section of die 11 is illustrated in FIG. 2. A bushing 16 surrounds an outer mandrel 17 to provide an annular passage 18 through which the resin is extruded to form pipe 14. It is preferred that this passage be tapered in the manner described in U.S. Pat. No. 3,393,427, the disclosure of which is herein incorporated by reference. An outer sleeve 19 is mounted on bushing 16, and is provided with a spiral groove 20. An inlet port 21 and an outlet port 22 are formed in sleeve 19 so that a fluid introduced through port 21 flows in a spiral path through groove 20 and is removed through port 22. Sleeve 19 thus forms a heat exchanger to provide cooling of bushing 16. A second sleeve 24 is mounted on an inner mandrel 25, the latter being secured to mandrel 17. Sleeve 24 is provided with a spiral groove 26, an inlet port 27 and an outlet port 28. Passages 29 and 30 extend through mandrel 25 to communicate with respective ports 27 and 28. A spider is formed in the extruder body 10 to permit passages 29 and 30 to be connected to respective external conduits 32' and 33' of FIG. 1.

As illustrated in FIG. 1, fluid is introduced into port 21 through a conduit 32 and is removed from port 22 through a conduit 33. Conduits 32 and 33 are connected to a controller 34. Cool water is supplied to controller 34 through a conduit 35, and heated water is removed through a drain conduit 36.

Figure 3:
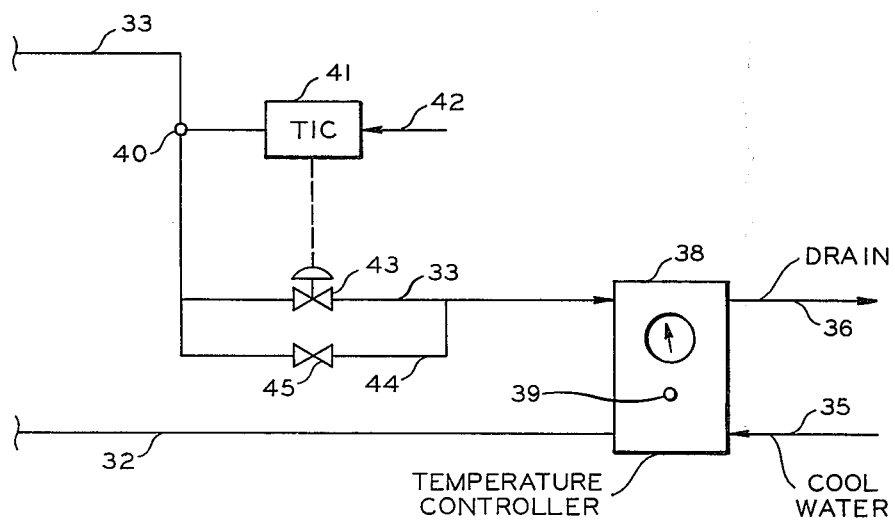
FIG. 3 is a schematic representation of an embodiment of the controller employed in the apparatus of FIG. 1.

Controller 34 is illustrated in FIG. 3. The cool water is introduced through conduit 35 into a temperature controller 38 which serves to adjust the temperature of the water withdrawn through conduit 32. Temperature controller 38 is provided with a heater which elevates the temperature of the supplied water as may be required so that water is delivered to die 11 at a predetermined temperature. A control knob 39 regulates the amount of heat supplied to the cool water to provide this control. Although various types of temperature controllers are well known and available commercially, one particular type of controller that can be employed to advantage is the Sterl-Tronic S-6300 temperature control unit manufactured by Sterling, Inc., 5200 West Clinton Avenue, Milwaukee, Wisconsin 53223. This Sterl-Tronic controller is provided with a pump and a recirculation line so that a portion of the returned water can be recirculated to the die at the preselected temperature set by knob 39. Thus, water at a preselected temperature is passed through conduit 32 to inlet port 21 of the heat exchanger formed by sleeve 19 in FIG. 2.

After passage through groove 20, the water is removed through port 22 and returned by conduit 33 to temperature controller 38. A temperature sensing element 40 is connected to conduit 33 to measure the temperature of the water withdrawn from port 22 and to provide a signal representative of this measured temperature. This signal is applied as the input signal to a conventional temperature indicator-controller 41. A setpoint signal 42 is also applied to controller 41. Controller 41 compares the setpoint signal with the measured temperature signal, and provides an output signal representative of any difference. This output signal is applied to a control valve 43 in conduit 33. The rate of flow of fluid through spiral groove 20 is thus adjusted so as to maintain the temperature of the fluid removed through port 22 at a predetermined value as established by the setpoint signal 42.

A conduit 44, having a needle valve 45 therein, is connected in parallel with valve 43. Needle valve 45 can be adjusted so that a small flow is maintained through the system at all times. It has been found that such a small flow tends to stabilize the control system. This also permits the temperature controller to be adjusted so as to operate at approximately the midpoint of its range to provide more sensitive control.

Controller 34' can be of the same configuration as controller 34. In some extrusion operations, two separate heat exchangers may not be required. Under these conditions, a single controller 34 is all that is needed. Sensing element 40 should be located near exit port 22. If desired, element 40 can be located to measure the temperature of the heat exchange fluid as it leaves the heat exchanger through port 22.

In one specific embodiment of this invention, polyethylene pipe having a wall thickness of about 0.42 inch and an outside diameter of about 4.5 inches is produced in a dynamic extruder at a rate of about 12 inches a minute. Water is supplied by conduits 32 and 32' at temperatures of about 52° F. and 70° F., respectively. Water is removed from the heat exchangers through conduits 33 and 33' at temperatures of about 112° F. and 74° F., respectively. The flow rate through groove 26 is in the range of about 5 to 10 gallons per minute, while the flow rate through groove 20 is more nearly constant at about 20 gallons per minute. In any given operation, the temperatures and flow rate setpoints are adjusted to give the best operation.

It has been found that extruded products of smoother surface appearance and closer tolerance to specifications can be produced by the temperature profile control method of this invention. In addition, reductions in die pressure and motor load can be obtained in dynamic extrusion operations.

While this invention has been described in conjunction with a presently preferred embodiment, it obviously is not limited thereto.

What is claimed is:

1. In an extrusion apparatus which includes a reciprocating piston type extruder, a die having a first passage extending therethrough through which thermoplastic material being extruded passes for shaping said material, said first passage being tapered to compensate for shrinkage of said thermoplastic material and a heat exchanger in heat exchange relationship with said die which exchanger extends longitudinally along the die, said heat exchanger having a second passage therein through which a fluid can be circulated, temperature regulating apparatus comprising:
    conduit means communicating with said second passage to introduce a fluid;
    temperature control means connected to said conduit means for regulating the temperature of fluid introduced into said second passage so as to introduce such fluid at a constant predetermined temperature;
    means to measure the temperature of fluid removed from said second passage; and
    means responsive to said means to measure temperature to control the rate of flow of fluid through said second passage so as to maintain the measured temperature constant.

2. The apparatus of claim 1 including second conduit means communicating with said second passage to remove fluid therefrom, and wherein said means to measure temperature is connected to said second conduit means adjacent said second passage.

3. The apparatus of claim 2 including a valve in said second conduit means, and wherein said means to control regulates said valve.

4. The apparatus of claim 3, further comprising third conduit means connected in parallel with the valve in said second conduit means to permit flow through the heat exchanger regardless of the position of said valve.

5. The apparatus of claim 1 wherein said first passage is of annular configuration and said heat exchanger is positioned inside said first passage, and wherein said extrusion apparatus includes a second heat exchanger extending longitudinally along said die outside said first passage, said second heat exchanger having a third passage therein through which a fluid can be circulated, said temperature regulating apparatus further comprising:
    second conduit means communicating with said third passage to introduce a fluid;
    second temperature control means connected to said second conduit means to regulate the temperature of fluid introduced into said third passage so as to introduce such fluid at a constant predetermined temperature;
    second means to measure the temperature of fluid removed from said third passage; and
    means responsive to said second means to measure temperature to control the rate of flow of fluid through said third passage so as to maintain the measured temperature constant.

* * * * *